United States Patent [19]

Slater

[11] 4,272,042
[45] Jun. 9, 1981

[54] AIRSHIP AND ASSOCIATED APPARATUS AND METHOD FOR ANCHORING SAME

[75] Inventor: Saul I. Slater, Miami Beach, Fla.

[73] Assignee: Hov-Air-Ship, Inc., Miami Beach, Fla.

[21] Appl. No.: 809,130

[22] Filed: Jun. 22, 1977

Related U.S. Application Data

[63] Continuation-in-part of Ser. No. 674,278, Apr. 14, 1976, Pat. No. 4,085,912, which is a continuation-in-part of Ser. No. 552,793, Feb. 25, 1975, Pat. No. 3,971,533.

[51] Int. Cl.$^2$ .......................... A64B 1/66; B64F 1/12
[52] U.S. Cl. ..................................... 244/115; 244/25; 244/26; 244/30; 294/65.5; 294/66
[58] Field of Search .............................. 244/2, 24–30, 244/114–116, 110 R, 93, 127, 125, 66; 294/65.5; 114/242, 249

[56] References Cited

U.S. PATENT DOCUMENTS

| | | | |
|---|---|---|---|
| 1,351,931 | 9/1920 | Ullmann | 244/115 |
| 1,567,703 | 12/1925 | Broyles | 244/115 |
| 1,726,062 | 8/1929 | Gilman | 244/25 |
| 1,821,158 | 9/1931 | Howland | 244/2 |
| 1,949,304 | 2/1934 | Harding | 244/2 |
| 2,150,428 | 3/1939 | Crum et al. | 244/115 |
| 2,179,625 | 11/1939 | Groden | 294/65.5 |
| 2,386,814 | 10/1945 | Rosendahl et al. | 244/116 |
| 3,096,047 | 7/1963 | Dunn | 244/26 |
| 3,151,826 | 10/1964 | Michel | 244/115 |
| 3,181,810 | 5/1965 | Olson | 244/66 |
| 3,972,493 | 8/1976 | Milne | 244/115 |
| 4,030,441 | 6/1977 | Nagata et al. | 294/65.5 |

FOREIGN PATENT DOCUMENTS

| | | | |
|---|---|---|---|
| 397795 | 6/1924 | Fed. Rep. of Germany | 244/115 |
| 2057287 | 5/1972 | Fed. Rep. of Germany | 244/25 |
| 142573 | 5/1920 | United Kingdom | 244/115 |
| 162135 | 4/1921 | United Kingdom | 244/115 |
| 182792 | 11/1923 | United Kingdom | 244/115 |
| 316554 | 7/1930 | United Kingdom | 244/115 |
| 1333490 | 10/1973 | United Kingdom | 294/65.5 |

OTHER PUBLICATIONS

Edwards, Alun, "Magnetic Tools", *The Engineer*, Aug. 11, 1961, pp. 224–227.

*Primary Examiner*—Galen L. Barefoot
*Attorney, Agent, or Firm*—Morgan, Finnegan, Pine, Foley & Lee

[57] ABSTRACT

An airship and a magnetically operated anchoring assembly adapted to provide rotation of the airship with respect to the ground, includes a gondola mounted to an envelope structure adapted to house lighter-than-air gas as well as any enclosures which may be used for containing the gas and a magnet device mounted to and operable from the gondola for attraction to a magnetically attractive anchoring structure secured to the ground. As preferably embodied, the magnet device is adapted to permit rotation of the gondola about the anchor point and the gondola is mounted to the envelope so as to be positionable at various desirable points under the longitudinal axis of the airship. Alternatively, the magnet may be mounted to a generally front-facing portion of the airship and the anchoring structure includes a mast with a magnetically attracting cylinder rotatably mounted to the mast at a height sufficient to enable mating with the magnet device on the airship.

42 Claims, 34 Drawing Figures

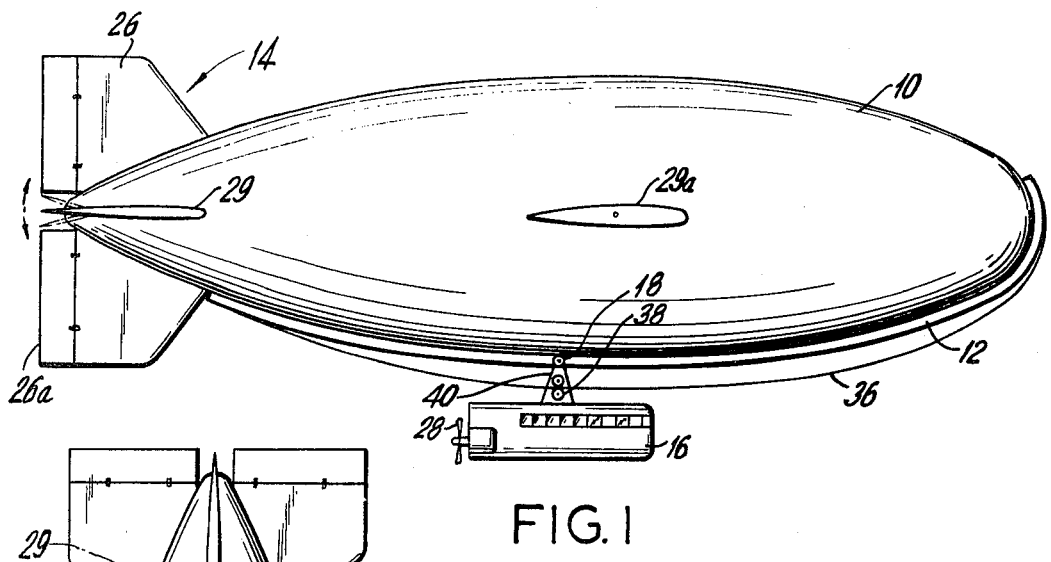
FIG. 1
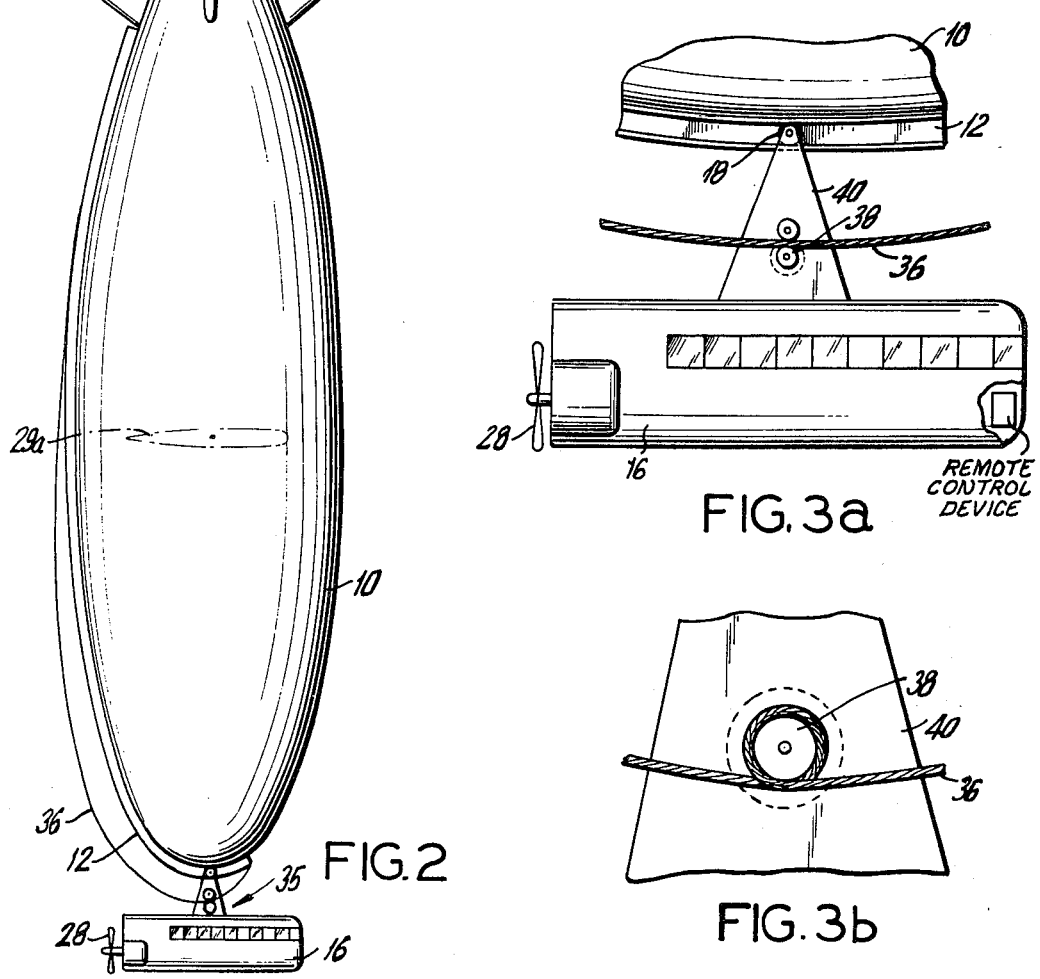
FIG. 2
FIG. 3a
FIG. 3b

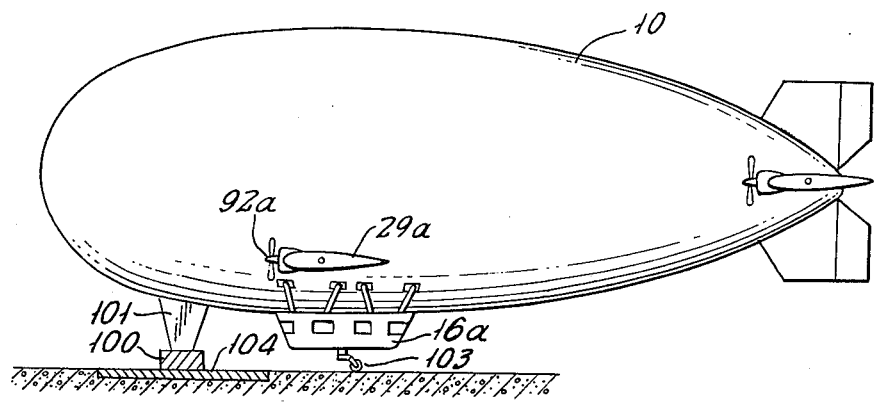
FIG. 22
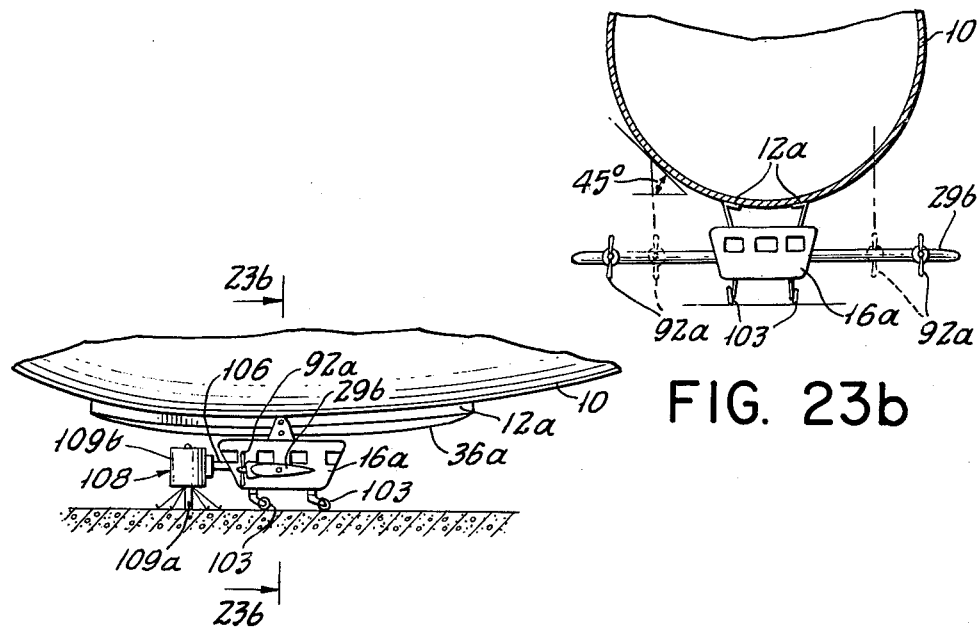
FIG. 23b
FIG. 23a

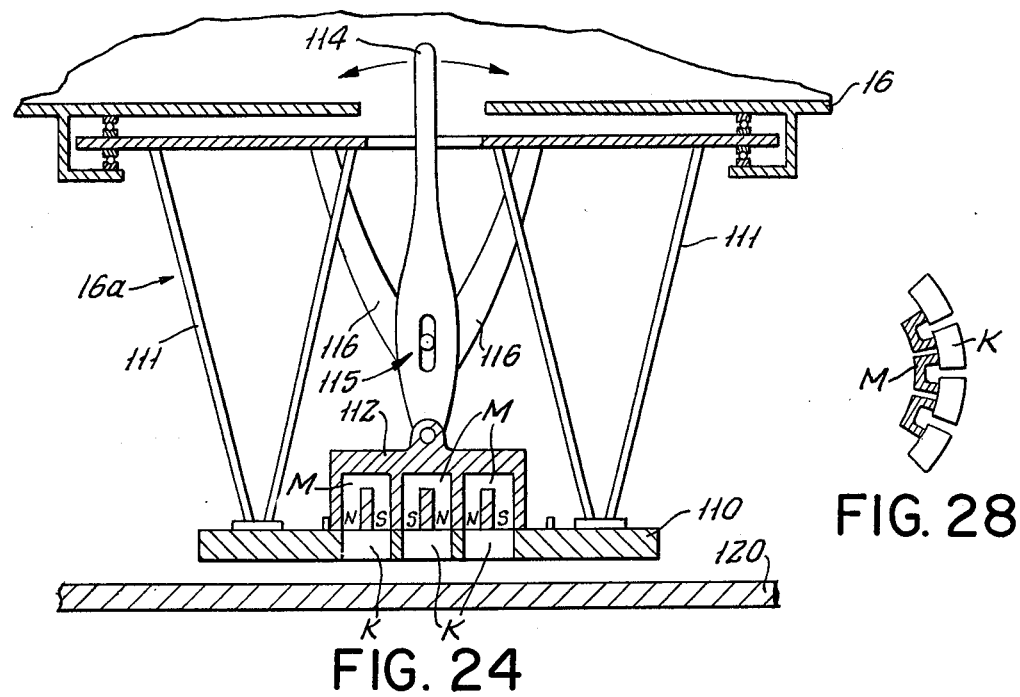
FIG. 24
FIG. 28
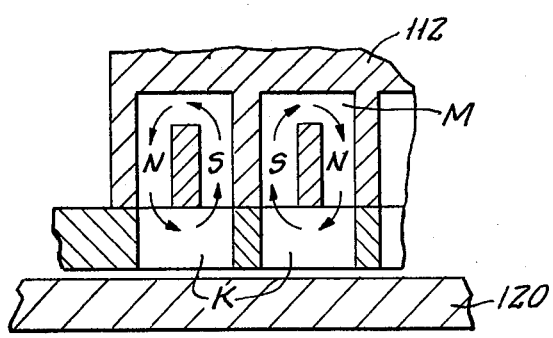
FIG. 25a
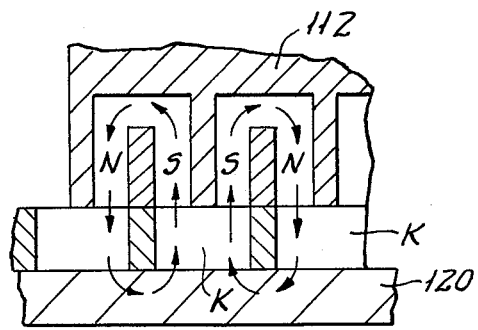
FIG. 25b
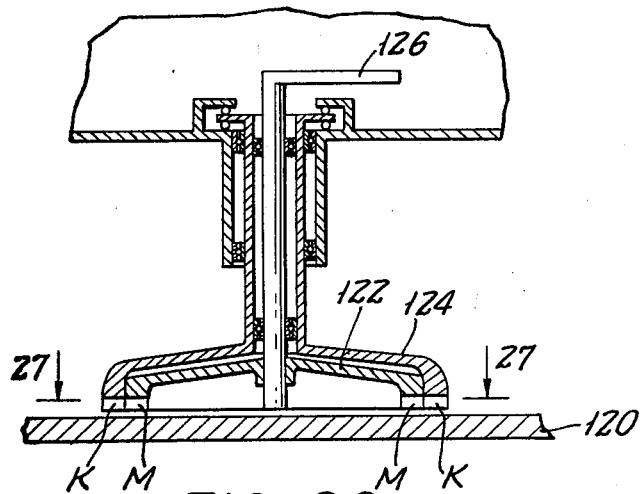
FIG. 26
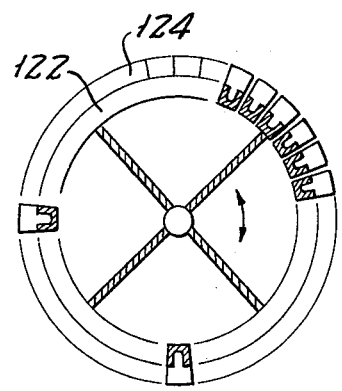
FIG. 27

AIRSHIP AND ASSOCIATED APPARATUS AND METHOD FOR ANCHORING SAME

CROSS REFERENCE TO RELATED APPLICATIONS

This application is a continuation-in-part of my co-pending application, Ser. No. 674,278, filed Apr. 14, 1976, now U.S. Pat. No. 4,085,912, which was a continuation-in-part of my then co-pending application Ser. No. 552,793, filed Feb. 25, 1975 and now U.S. Pat. No. 3,971,533, granted July 27, 1976.

BACKGROUND AND OBJECTS OF THE INVENTION

The present invention relates generally to lighter-than-air gas-containing airships, and more particularly to a method and associated apparatus for landing and anchoring airships.

Balloons, blimps and zepplins have captured the fancy of man since he first aspired to fly. These airships combine desirable characteristics from the standpoint of aerodynamics travel economy and ecology. Lighter-than-air vehicles can remain aloft indefinitely and are capable of touching down in areas which would be inaccessible for most other conventional transport vehicles. They can be powered by a simple propeller engine and refueling can be accomplished either directly from the ground or by means of a simple umbilical cord from another aircraft.

Airships containing lighter-than-air gas provide inexpensive and environmentally inoffensive means of transporting people or cargo. Unfortunately, rigid frame zepplins are virtually obsolete and, amoung currently utilized airships, blimps have been relegated to use for advertising and promotional campaigns while balloons find frequent use by fanciful dare-devils in attempted uncontrolled—and usually unsuccessful—record free-air flights.

People have been reticent since the later 1930's to pursue flight by lighter-than-air vessels, after the "Hindenburg" was mysteriously and spectacularly consumed by flames. However, with little modification of old designs—most notably through the use of inert helium gas rather than flammable hydrogen—the airship can be a most useful advance in the field of transportation. One disadvantage to current airships, which the present invention overcomes, is their bulky front to rear size which necessitates large ground area in order to accommodate landing for loading, unloading and refueling.

Another disadvantage of most conventional airships is the awkwardness and expense associated with landing and anchoring them. In general, once the airship nears the ground, a large (about 10- to 25-man) ground crew is needed to "pull" the airship down to the ground by cables lowered from the gondola and direct the nose of the airship into the anchoring mechanism. Thus, not only is the method of landing somewhat primitive, awkward and time-consuming, but also it involves substantial expense in the form of bulky anchoring structures, compensation for the ground crew, and a relatively lengthy landing approach area.

Moreover, the dangling cables from the airship are dangerous since they can touch high-power lines or get caught in trees and the like. Furthermore, such airships are incapable of truly vertical landing (i.e., without forward movement) unless the ground crew is pulling down the airship. In addition, with the airship tied at its bow to the anchoring stanchion, the airship requires a substantial land area for anchoring if, as is the conventional method, the airship is to be free to swing around the anchoring structure. Thus, with the airship moored by its nose, the circular land area required for mooring the airship has a diameter equal to about twice the length of the airship.

One prior art patent, U.S. Pat. No. 1,567,703 issued to Broyles, discloses an anchoring assembly which includes an anchor which is lowered from the gondola and has electromagnets mounted therein. The anchor is suspended by a cable and winch assembly which enables the anchor to be lowered from the gondola and the airship to be pulled down by the winch once the electromagnets have magnetically engaged a suitable anchoring member on the ground, which rigidly anchors the airship to the ground without rotatable capability. Thus, the only rotatability provided by the anchoring mechanism of Broyles is in the cables used to pull the airship to the ground. However, during the pulling-down operation, the airship would be completely at the mercy of the wind while supported by the cable which could be chaffed during the winching operation. In addition, the force acting on the magnet/anchor via the cable disposed in any direction other than vertical would effectively cause a moment on the anchor, which weakens the magnetic attraction between the magnet/anchor and the anchoring structure on the ground. Moreover, lowering the magnet by the cables does not enable truly precision anchoring nor does it enable completely free rotation of the airship relative to the ground since the cables could be twisted and snapped. Furthermore, the winch assembly would add an unnecessarily large amount of weight to the airship.

It is therefore an object of the present invention to provide a new and improved airship and anchoring means therefor. Another object of the present invention to provide new and improved methods and associated apparatus for landing and anchoring airships.

It is a further object of the present invention to provide a new and improved method and associated apparatus for landing and anchoring the airship, which enables landing and at least initial anchoring essentially by the pilot alone without the need for a ground crew.

It is also an object of the invention to provide a new and improved airship having a simple and strong anchoring means, with the airship requiring relatively less land area than conventional techniques for touchdown and anchoring.

It is yet a further object of the invention to provide an airship whose gondola can be located at various positions with respect to the longitudinal axis of the gas-containing structure so that the gondola can be positioned at the center of static and dynamic balance.

Objects and advantages of the invention are set forth in part herein and in part will be appreciated herefrom, or may be learned by practice with the invention, the same being realized and attained by means of the instrumentalities and combinations as well as the steps and operations pointed out in the appended claims. Accordingly, the invention resides in the novel method as well as the novel structures, arrangements and improvements herein shown and described.

SUMMARY OF THE INVENTION

Briefly described, the airship according to the present invention includes a generally elongate envelope structure adapted to house lighter-than-air gas as well as any enclosure means which may be used for containing the gas, a gondola mounted to said gas-containing structure, propulsion means mounted to the airship for driving the airship and magnet means attached to the airship for anchoring the airship to a suitable magnetically attractive structure affixed to the ground. According to one embodiment, magnet means are mounted to the bottom of the gondola for attraction, when activated, to a magnetically attractive plate or other similar structure embedded in the ground and the magnet means are adapted to enable rotation of the airship about the anchoring point. Advantageously, the airship is provided with attachment means between the envelope structure and the gondola for enabling the gondola to be moved with respect to the longitudinal axis of the envelope.

Alternatively, the magnet means are attached either to the nose of the airship or to the nose of the gondola and a generally tall mast-like anchoring member is secured to the ground so that the pilot can "drive" the airship towards the mast and anchor the airship by activating the magnet. As here preferably embodied, roller or castor means are attached to the bottom of the gondola and the mast-like structure includes a generally cylindrical portion of magnetically attractive material, which is rotatably mounted to the mast to enable the airship to rotate about the mast when anchored. Advantageously, the airship may also be provided with mounting means which enable the airship to be convertible from a generally horizontal configuration to a generally vertical configuration so that the airship can be landed vertically.

According to one embodiment, the magnet means may be an electromagnet operable from the gondola. Alternatively, the magnet means may comprise a magnetic clutch assembly wherein a permanent magnet member is adapted to be variably positioned, from the gondola, relative to a keeper member made of a non-magnetically attractive material but including magnetically attractive keeper elements spaced to correspond to the magnet elements of the magnet member such that each keeper element covers both poles of its corresponding permanent magnet element in the magnet assembly for positioning the magnet elements of the magnet member between a closed-flux position whereat each magnet is completely covered by its corresponding keeper element and an open-flux position whereat each keeper covers the same pole of two magnet elements to allow the magnetic flux to pass through the keepers which thereby effectively become magnets.

Advantageously, the airship may be provided with rotatable propulsion devices adapted to provide thrust variable through at least about 90°. As preferably embodied, propulsion devices may be rotatably mounted to the gondola and positioned outboard of the gondola so that when the thrust is directed perpendicular to the longitudinal axis of the airship at least half the thrust therefrom travels clear of the airship envelope.

It will be found that the airship according to the present invention exhibits the recognized advantages of lighter-than-air vehicles, including efficient and low-cost operation. In addition, by providing the airship with the rotatable magnet anchoring means according to the present invention, it will be found that the airship can be anchored, at least initially, without the need for a ground crew to pull the airship to the anchoring site. Thus, the anchoring can be accomplished essentially only by the airship pilot or crew.

Also, by providing magnet means on the gondola and rotatable propulsion devices on the airship, it will be found that the airship can be maintained in an essentially horizontal attitude while descending to (and ascending from) the anchoring site in a truly vertical manner without requiring cables, ground crews or a long landing approach. Moreover, with the propulsion devices rotatably mounted to the airship with at least about half their thrust projected, outboard of the airship envelope, the thrust therefrom (i.e., the updraft generated by the propulsion devices, will be directed so as to have a substantial portion of the thrust free from interference by the airship envelope not only to prevent the risk of damage thereto but also to provide sufficient free-flowing thrust for propelling the airship downwardly, since any thrust pressure incident on the envelope tends to negate the downward pull of the propulsion devices.

Moreover, by providing magnet means on a gondola which is mounted for movement along a track assembly attached to the envelope, the gondola can be moved to the center of gravity of the airship (which can actually vary in location due to variations in loading, ballonets, etc.) so that the airship can rotate about the anchor point like a weather vane (with the vertical stabilizers large enough to provide sufficient area to cause weather-vaning), while the airship remains essentially level. In addition, the anchored airship requires relatively less land area for anchoring than in conventional anchoring techniques. Moreover, the movability of the gondola further enhances the ability for maintaining a horizontal (i.e., level) attitude of the ship during landing maneuvers which can be conducted in an essentially vertical manner.

By providing magnet means at the nose of the airship or of the gondola, it will be found that the airship can be maneuvered into the wind by the pilot toward the anchoring mast for controlled landing and anchoring.

It will be understood that the foregoing general description as well as the following detailed description are exemplary and explanatory of the invention, but are not restrictive thereof. Accordingly, the accompanying drawings, referred to herein and constituting a part hereof, illustrate preferred embodiments of the invention and, together with the description, serve to explain the principles of the invention.

BRIEF DESCRIPTION OF THE DRAWINGS

FIG. 1 is a side view of an airship according to the present invention with its longitudinal axis horizontal.

FIG. 2 is a side view of an airship according to the present invention with its longitudinal axis vertical.

FIGS. 3a-3b are side views showing mounting and positioning means according to one aspect of the present invention.

FIG. 22 is a partial side view of a variation of the aspect of the invention shown in FIG. 21.

FIG. 23a is a side view of another embodiment of airship anchoring apparatus according to the present invention.

FIG. 23b is a view taken along section 23b—23b of FIG. 23a.

FIG. 24 is a side view of magnetic anchoring means according to one aspect of the present invention.

FIGS. 25a & b are side views of the operative arrangements of the embodiment shown in FIG. 24.

FIG. 26 is a section side view of an alternate embodiment according to the aspect of the present invention described with respect to FIG. 24.

FIG. 27 is a view taken along section 27—27 of FIG. 26.

FIG. 28 is a section of the embodiment shown in FIG. 27 in a shifted configuration.

DETAILED DESCRIPTION OF THE PREFERRED EMBODIMENT

Figure 7:
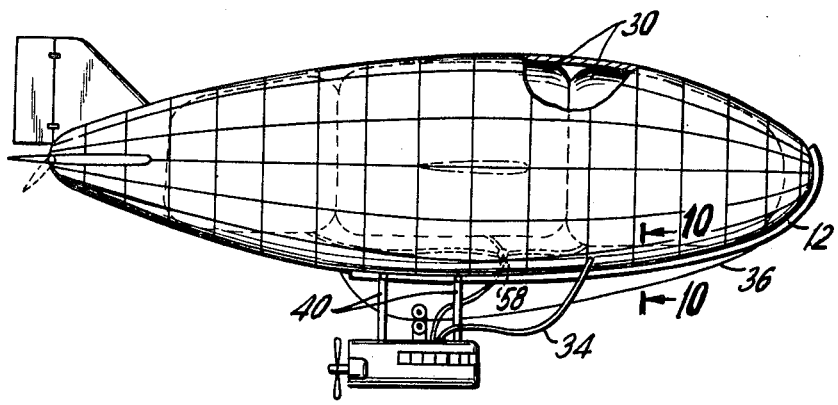
FIG. 7 is a side view of an airship having multiple support members affixed to one or more structural/track members.

Referring now to FIGS. 1 and 2, the airship according to the invention comprises gas-containing envelope 10 adapted to contain a lighter-than-air gas. Envelope 10 may be a substantially all-fabric structure whose shape is maintained through internal gas pressures (such as in a blimp) as shown in FIG. 7 or it may be a rigid-frame/fabric structure (dirigible) such as that shown in FIG. 4. The airship envelope 10 has rigid structural/track support member 12 mounted substantially along the underside of the envelope. Advantageously, structural/track member 12 extends from a point aft of the midsection to a point above the nose of the gas envelope. Gondola 16 is pivotally and slidably mounted to structural/track member 12 by mounting means 18 which may form the upper end of gondola support member 40. Mounting mean 18 is fitted onto structural/track member 12 such that gondola may "slide" laterally along member 12 and rotate about said mounting means at any point on member 12.

Figure 9D:
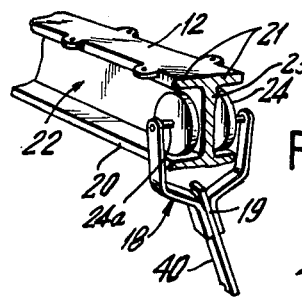
FIGS. 9a–9d are perspective views of structural/track members, mounting means and positioning means according to different aspects of the present invention.
Figure 9A:
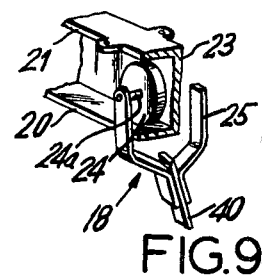

Referring now to FIG. 9a, structural/track member 12 may be a channel beam having web section 23, extended low flange 20 and upper flange 21. Mounting means 18 comprises roller means 24, on axle means 24a, which rides on the upper surface of flange 20. Bracing means 25 which may be a vertically oriented post is formed on yoke or cradle 19 portion of support member 40. Bracing means 25 is preferably maintained in close proximity to web 23 in order to steady gondola 16 as it slides and/or pivots and to prevent mounting means 18 from becoming disengaged from structural/track member 12. Alternatively, bracing means 25 may include second roller means 27 having its axis of rotation substantially parallel to web 23 as shown in FIG. 9b in order to allow substantially frictionless movement of the gondola as it slides and/or pivots with respect to member 12.

Figure 9C:
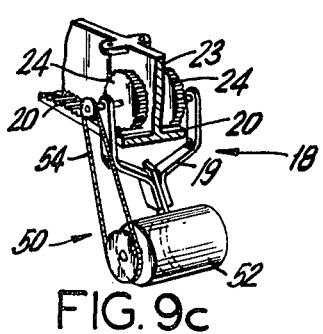
Figure 9B:
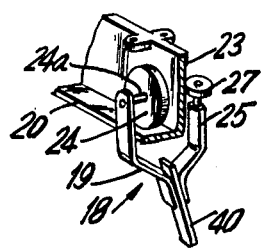
Figure 10:
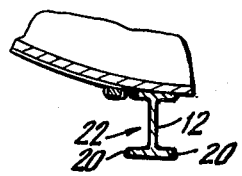
FIG. 10 is an enlarged view of section 10—10 of FIG. 7.

According to another aspect of the present invention, structural/track member 12 can be an angle beam having web 23 and flange 20 as shown in FIG. 9b. Mounting member 18 may be substantially similar to that described for use with the channel beam. It is particularly useful for this embodiment that cradle 19 of mounting member 18 be formed so as to ride close to the bottom of lower flange 20 in order to prevent roller 24 of mounting member 18 from rising to either puncture the gas envelope or "derail" from the track.

Alternatively, structural/track member 12 can be a T-beam including web 23 and two flanges 20 as shown in FIG. 9c. Mounting means 18 can comprise a double roller cradle 19 having two roller means 24 which ride, one each, on the two flanges 20. As discussed above with reference to FIG. 9b, the cradle 19 may be formed close to the bottom of beam flanges 20 in order to prevent puncture of the gas envelope, or derailment.

In the preferred embodiment, as depicted in FIG. 9d, structural/track member 12 comprises an I-beam comprising web section 23, two upper flanges 21 and two flanges 20. Two channels 22, separated by web 23, are defined in the I-beam to accommodate two roller means 24 for mounting the gondola onto track member 12. Thus, the gondola is capable of both pivotal and slidable movement with respect to the gas envelope as shown in FIGS. 1 and 2. Cradle 19 of mounting means 18 may be formed in any convenient configuration since upper flanges 21 contain the mounting member 18 to prevent puncture of envelope 10 or derailing.

In order to control the flight of an airship according to the present invention, the airship is provided with tail wing assembly 14 comprising at least one vertical stabilizer 26 and two horizontal stabilizers 29 which can be formed with rudders and ailerons respectively. Advantageously, the operable portions of the tail wing assembly may be remotely controlled by remote control means (illustrated in cut-away in FIG. 3a) from the gondola.

In a particularly useful embodiment of the present invention, the horizontal stabilizers may be completely pivotally attached to the gas envelope, as shown in FIG. 2, for enhancing the stability of the airship. Accordingly, while the gondola traverses from its "normal" position below the belly of gas-containing envelope 10 (to rotate the longitudinal axis of the gas envelope), the horizontal stabilizers can be simultaneously rotated through 90° such that their axes remain substantially parallel to the ground or to the wind velocity thereby lending additional stability to the vertically extending gas envelope, especially during its rotating maneuvers. Advantageously, wings 29a may be added to the airship, and pivotally mounted to envelope 10, as shown by FIGS. 1-2. Wings 29a may be rotated substantially synchronously with the horizontal stabilizers to further enhance the airship's stability. Furthermore, when envelope 10 is oriented in or is being reoriented to a vertical configuration, propulsion means 28 may be continuously operated so as to assist maintaining the airship in a substantially stationary posture. This is particularly useful to prevent appreciable drift of the airship when preparing to load or unload, or while performing its maneuvers.

Figure 4:
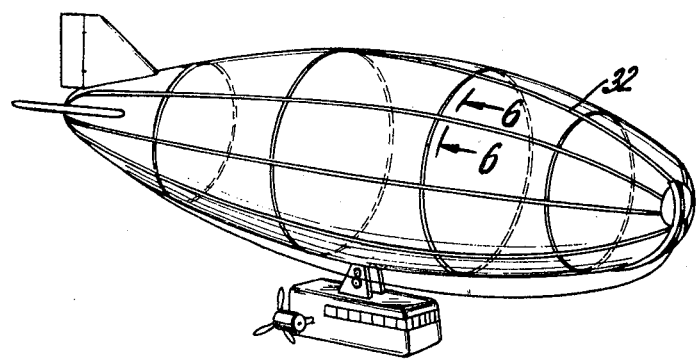
FIG. 4 is a perspective view of the outer skin support structure for an airship employing the present invention.
Figure 5:
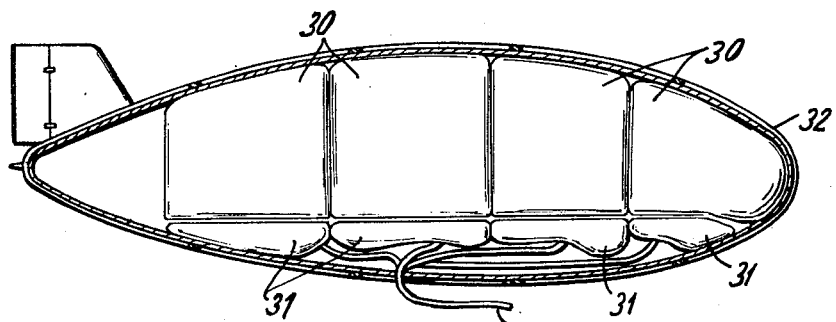
FIG. 5 is a cut-away view showing internal gas bags.

Whether the airship is a rigid frame-fabric gas envelope as shown in FIG. 4 or an all-fabric gas envelope as shown in FIG. 7, gas-containing envelope 10 may house gas bags 30 fitted therein. Gas bags 30 are adapted to contain the lighter-than-air gas, such as helium, to provide the buoyancy for lifting the airship. The airship's accent and descent is governed by manipulating the effective density of the gas contained by bags 30 and suitable means are included in the airship to accomplish this. Accordingly, envelope 10 may be formed with airtight outer skin 32 and connected to a source of air or other suitable "heavy" gas (hereinafter referred to as air) by umbilical cord 34. Airship descent is effected by forcing the air through conduit 34 into outer skin 32. The pressure generated by the introduced air compresses gas bags 30 to increase the effective density of the lighter-than-air gas in the bags. Additional ballast is also provided by the weight of the air. The buoyancy of the airship is thereby reduced, causing a loss in altitude. Alternatively, airtight bags 31 may be provided within envelope 10 for receiving the air through branches of conduit 34 as shown in FIG. 5. This is particularly useful in maintaining control of the airship despite any damage which may have been suffered by the outer skin. Likewise, when ascent is desired, the air is evacuated from envelope 10, or air bags 31, to relieve the pressure on gas bags 30 and to release the air ballast. The gas within gas bags 30 expands, thereby reducing the effective density of that gas to increase buoyancy of the airship.

In normal operation, gondola 16 is positioned substantially mid-way under the belly of the gas envelope to maintain the airship in substantially horizontal equilibrium during flight. The airship is driven by propulsion means 28 which can be either a simple propeller engine or turbopropeller engine. However, it will be understood that gondola 16 may be positioned anywhere along member 12 for balance such as when additional propulsion devices 60 are mounted to envelope 10, as hereinafter described.

When the airship according to the present invention has reached its destination, gondola 16 may be moved laterally along structural/track member 12 toward the airship's nose by positioning means 35. As the gondola travels along track member 12, the longitudinal axis of gas-containing envelope 10 rotated towards a substantially vertical orientation.

According to one aspect of the present invention, positioning means 35 is connected to gondola 16 to govern its position along structural/track member 12. Positioning means 35 may comprise cable 36 and winch means 38. Cable 36 may be conveniently affixed to envelope 10 such as by attachment to the two ends of track member 12. Furthermore, cable 36 may be substantially taut to prevent drift of gondola 16 vis-a-vis track member 12.

Winch means 38 acts on cable 36 to pull gondola 16 along member 12 via mounting means 18 which may comprise a combination of roller means 24 and axle means 24a. As gondola 16 nears the nose of gas-containing envelope 10, mounting means 18 allows pivoting of gondola 16 about its point of contact on member 12 such that gondola 16 remains substantially horizontal. In operation, as gondola 16 moves along structural/track member 12 via mounting means 18, the action of the shifting positions of the gondola's weight, which may be represented as a point load acting on member 12, causes the gas-containing envelope 10 to rotate its longitudinal axis continuously until the gondola reaches the section of member 12 adjacent the nose at which time the longitudinal axis is substantially vertical.

According to another aspect of the present invention positioning means 35 may comprise non-slip interface between roller means 24 and flanges 20 having a non-slip interface therebetween which may be in the form of cooperating teeth formed on both roller means 24 and the upper surfaces of each flange 20 as shown in FIG. 9c. Alternatively, positioning means 35 may comprise a high friction roller-flange interface such as by rubberized roller means 24 abutting a roughened upper surface of each flange 20. According to either embodiment, roller means 24 may be rotated by any convenient drive means 50. Drive means 50 may comprise either a conventional chain-drive motor means 52-54 which rotates roller means 24 as shown in FIG. 9c, or it may be a direct drive motor connected directly to roller means 24.

Figure 8:
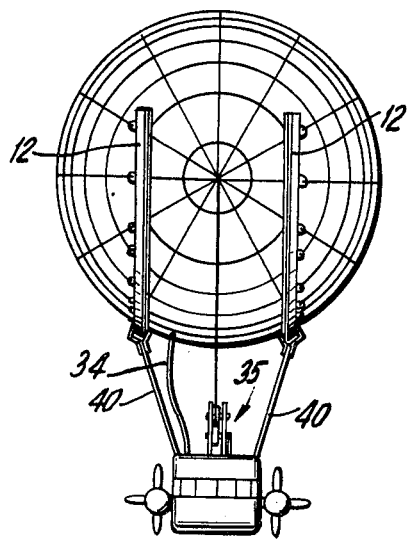
FIG. 8 is a front view of an airship according to the present invention having two structural/track members.

FIGS. 7 and 8 depict another aspect of the present invention in which gas-containing envelope 10 may be provided with two structural/track members 12 and gondola 16 is formed with multiple support members 40, each provided with a mounting assembly 18, as described above with reference to FIGS. 9a-9d, for mounting the gondola to the structural/track members. This is particularly useful for large capacity airships which can accommodate heavy cargo. Advantageously, the gondola may be provided with four support members 40 on the two structural/track members to prevent any substantial forward-to-aft or side-to-side pitching of the gondola due to gusting winds etc. during flight.

In operation, the gondola rides below the belly of the gas envelope as in a common dirigible or blimp such that the longitudinal axis of the gas-containing envelope 10 is generally parallel to the ground. Should the airship encounter high winds, the gondola may be moved forward or backward of the normal equilibrium point to give the airship an angle of attack, negative or positive with respect to air flow to enhance stability during flight.

The airship according to the present invention is particularly adapted for convenient refueling, loading and unloading at points of origin and ultimate destination, especially where such points are inaccessible by other conventional transport means. The gondola is brought forward to the nose of the airship, thereby rotating the longitudinal axis of the gas envelope to a substantially vertical orientation as shown in FIG. 2. With the gondola so positioned, the helium gas bags can be compressed by the introduction of air through umbilical cord 34, causing the airship to descend.

Alternatively, descent of the airship can also be effected by allowing the lighter-than-air gas to escape from gas bags 30. Accordingly, bleeding means which may be in the form of a remote controlled release valve (not shown) or second umbilical cord assembly 58 (shown in FIG. 7 connected to gondola 16) for controlling the quantity of gas in gas bags 30. This procedure for descent is particularly useful when gas envelope 10 and/or air bags 31 are damaged whereby altitude control would otherwise be lost, or when an emergency arises and rapid descent must be effected. Furthermore, this bleeding means can be utilized in reverse for filling gas bags 30.

As the airship is descending for a landing in accordance with one of the above-described procedures, or in accordance with one of the hereinafter described features, gondola 16 may be landed directly on the ground or adjacent a loading platform by utilizing propulsion means 28 in conjunction with the ailerons and elevators provided on stabilizer assembly 14 to guide the airship to its proper landing position. This permits a simple method of landing the airship at a site of limited area, whereby a tie-line may be lowered to a landing crew which can have the airship pulled down to its proper landing position. Once in landing position, the airship can be anchored or suitably tied down, especially as hereinafter described, for loading, unloading or refueling. Thus, passengers and/or cargo may be loaded or unloaded directly onto the gondola without necessitating additional equipment such as lowering and hoisting winches or shuttle craft. Furthermore, the present invention obviates the need for intermediate storage facilities and minimizes the necessity for subsequent transporting when used for shipping cargo.

As a further feature of the present invention, when the airship is landing or has landed and a strong wind prevails at the landing site, the airship can be stabilized by utilizing fully rotatable horizontal stabilizers 29, and rotatable wings 29a if present, in conjunction with propulsion means 28 to cut into the wind and stabilize the vertically extending envelope with respect to the air flow. In addition, the horizontal stabilizers and wings may be oriented with a negative angle of attack to urge the airship toward the ground and enhance its stability vis-a-vis the ground.

Figure 11:
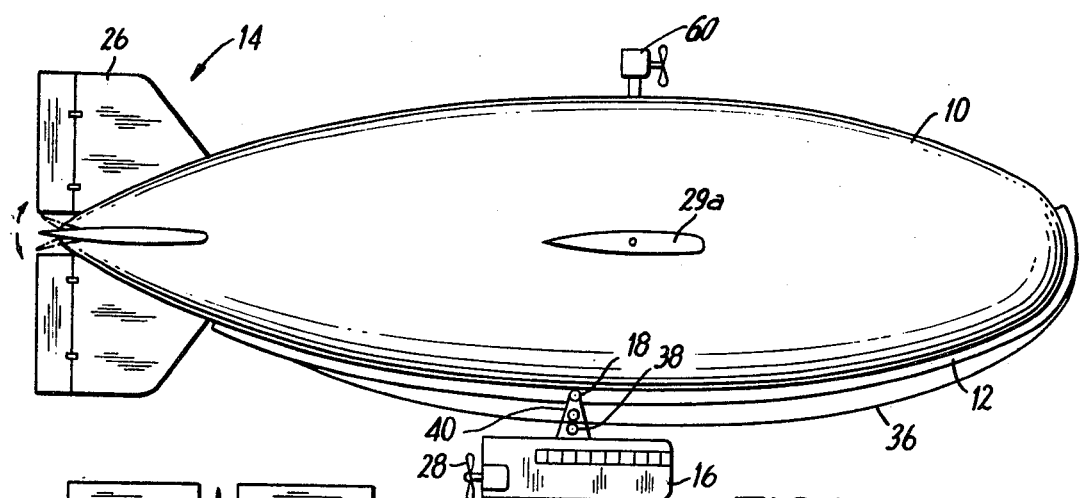
FIG. 11 is a side view of another embodiment of the present invention.
Figure 12:
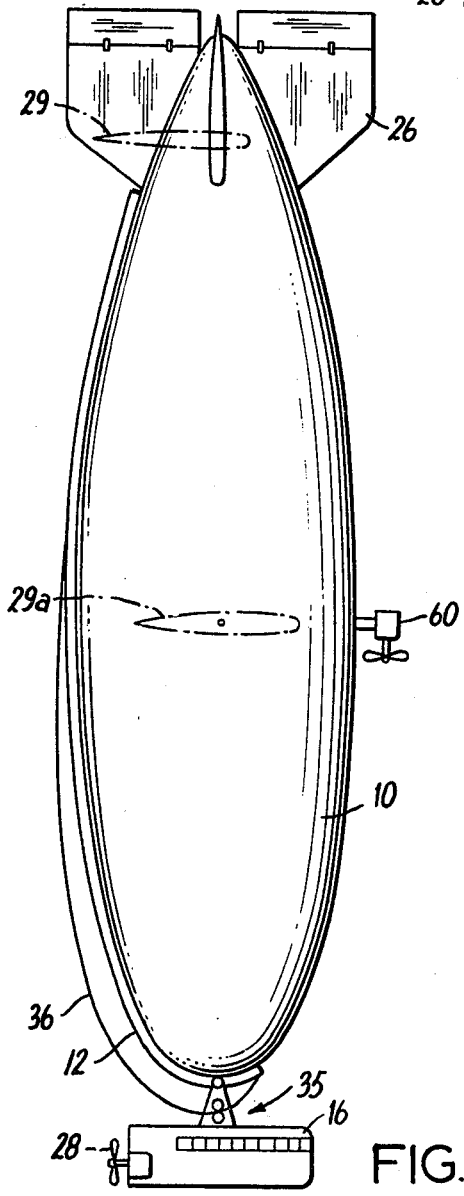
FIG. 12 is a side view of the embodiment shown in FIG. 11 in a generally vertical configuration.

Referring now to FIGS. 11 and 12, there is shown a preferred embodiment of the present invention which can obviate the need for apparatus for varying the effective density of the lighter-than-air gas contained in gas-containing envelope 10. According to this aspect of the invention, envelope 10 is provided with at least one additional propulsion means (indicated by reference numeral 60) mounted thereto such that it provides propulsion at a substantially constant orientation with respect to the longitudinal axis of envelope 10. Additional propulsion means 60 may therefore be utilized to drive this vehicle during flight. More importantly, and of most significance here, additional propulsion means 60 may be used to facilitate descent and touchdown of the vehicle, especially after a flight when the vehicle has greater buoyancy due to the loss in weight of expended fuel.

Figure 6:
FIG. 6 is an enlarged view along section 6—6 of FIG. 4.

Accordingly, once the desired landing site has been reached, the forward drive imparted by both propulsion means 60 and 28 is substantially ceased. Thereafter, the airship is brought into its landing configuration, as described more fully hereinbefore, wherein the longitudinal axis of envelope 10 is in a substantially vertical orientation. Using propulsion means 28 when necessary for maneuvering during descent and ascent, as described above, the airship may be driven towards the ground by propulsion means 60 in conjunction with tail wing assembly 14 for guidance, as well as wings 29a when employed. Thus, the need for a plurality of air bags 31, along with the pumping equipment and conduits described above with reference to FIGS. 5-7, or any other apparatus for reducing the effective density of the lighter-than-air gas contained within envelope 10, may be obviated, since propulsion means 60 furnishes the necessary impetus for bringing the airship home. Furthermore, propulsion means 60 may be continuously operated to keep the airship down when, for example, it is not desirable or it is impossible to anchor the airship.

Likewise, propulsion means 60 may be utilized for take-off and ascent of the airship, especially after it has been loaded with cargo and passengers and re-fueled, when the airship is at its heaviest. To this end, additional propulsion means 60 are provided with means for reversing its thrust to change the direction of the propulsion thrust. Thus, for example, when propulsion means 60 comprises a propeller engine, it may be provided with reversible pitch propeller means for completely reversing the thrust generated thereby. Accordingly, once the airship is ready for take-off, the thrust of additional propulsion means 60 is reversed, vis-a-vis that provided during landing, and the airship, with guidance from tail assembly 14 and wings 29a, will be propelled upwardly. Once airborne, envelope 10 can be re-oriented to a generally horizontal configuration and thereafter conduct normal in-flight operation.

For complete safety, however, it may not be adequate to rely upon a single additional propulsion device for ascent and descent capability. Therefore, it may still be necessary to provide some emergency device for controlling the effective density of the lighter-than-air gas contained in envelope 10. In addition, means for releasing lighter-than-air gas from envelope 10, such as bleeding means 58 described hereinbefore, may be included to provide descent capability in an emergency. Furthermore, more than one additional propulsion devices 60 may be mounted to envelope 10 for additional safety means and/or, as hereinafter described, for additional thrust.

Figure 13:
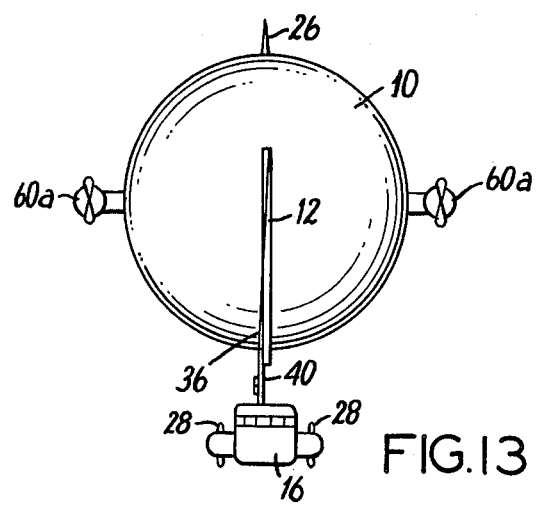
FIG. 13 is a front view of still another embodiment of the present invention.
Figure 14:
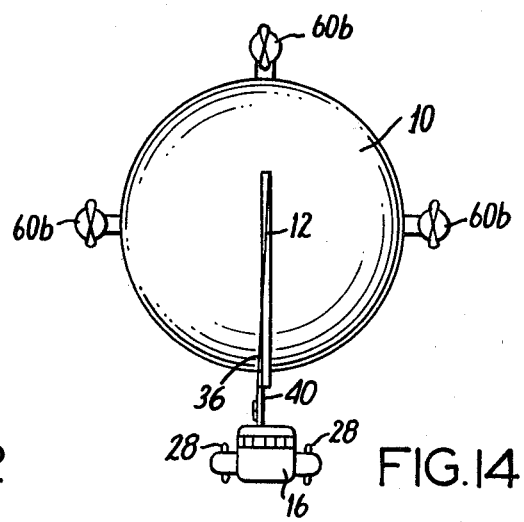
FIG. 14 is a front view of yet another embodiment of the present invention.

Referring therefore to FIGS. 13 and 14, there are shown, preferred embodiments of the present invention which include, respectively, two and three additional propulsion devices, 60a and 60b, respectively. Furthermore, individual control over each separate propulsion device will provide optimum stability of and control over the flight path of the airship during descent and ascent or forward flight in turbulence. Additional propulsion means 60 offer a further advantage when the airship has wings 29a (even if such wings are not rotatably mounted to the airship), since, after loading and refueling, the airship may not literally be "lighter-than-air". Accordingly, additional propulsion means 60 may be employed to lift the airship off the ground. Once the airship is airborne, it may be maintained aloft, in flight, through the lift provided by wings 29a as the vehicle is driven forward by the propulsion devices. Thus, the airship is capable of completely vertical take-off (for example, from areas of limited access, as discussed hereinbefore) yet of maneuvering substantially like a lighter-than-air vehicle when fully loaded and refueled.

Figure 18:
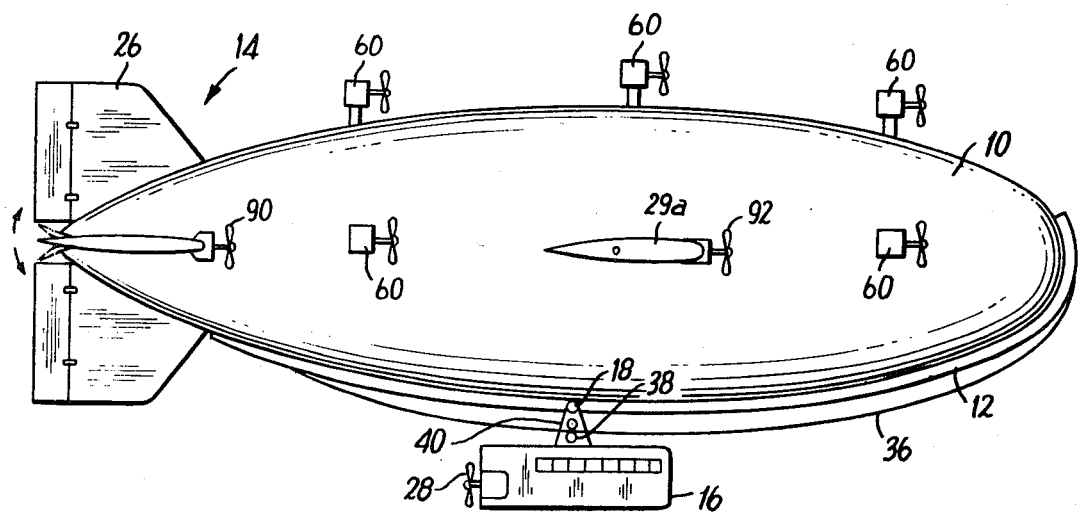
FIG. 18 is a side view of an embodiment of the invention having groups of propulsion devices mounted to the gas-containing structure.
Figure 16:
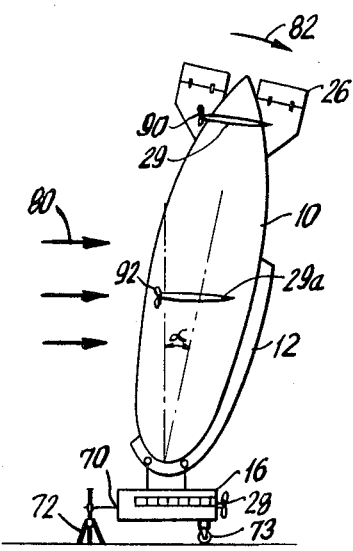
FIG. 16 is a side view of anchoring means according to the invention.

Referring now to FIGS. 16 and 18, there are shown embodiments of the present invention, which include additional propulsion devices mounted to rotatable horizontal stabilizers 29 and, when used, rotatable wings 29a, with additional propulsion devices 90 mounted to horizontal stabilizers 29 and propulsion devices 92 mounted to wings 29a when used. In addition to providing in flight forward thrust and vertical thrust capability for use in ascent and descent, when desired, propulsion devices 90 and 92 enable additional stability capability when the vertically extending airship is anchored and high winds are encountered. To this end, stabilizers 29 may be rotated to a generally horizontal orientation, or generally parallel to the wind flow, as described hereinbefore, with propulsion devices 90 running to provide thrust generally opposed to the wind direction. Thus, gas envelope 10 can be maintained in a generally vertical orientation to prevent damage to the airship by, for example, excessive deflection of envelope 10 (as measured by angle α, more than about 30° or 40°) which may strain the coupling means between gondola 16 and envelope 10 or propel envelope 10 into some nearby object which may pierce it. Also, by providing propulsion devices 90 mounted to rotatably mounted stabilizers, the airship is provided with greater response capability to up-drafts or down-drafts and assist controlling the airship during the landing and anchoring maneuvers described hereinafter.

Similarly, when the airship is being landed in windy conditions, stabilizers 29 and propulsion devices 90 may be directed so as to oppose the wind direction to assist controlling the descent (or ascent during take-off) of the airship during landing maneuvers and guiding it to touchdown. To this end, and when the airship includes rotatable wings 29a, additional propulsion devices 92 may advantageously be provided thereon to allow further control of the airship during ascent and descent as well as of envelope 10 when the airship is anchored, substantially as described above with reference to propulsion devices 90. However, where the wind conditions at the landing site are not of concern, propulsion devices 90, and 92 when provided, may be used to provide vertical thrust for supplementing additional propulsion devices 60 (or in place of devices 60 if none have been provided) to provide the vertical thrust for ascent and descent, as described hereinbefore.

Figure 15:
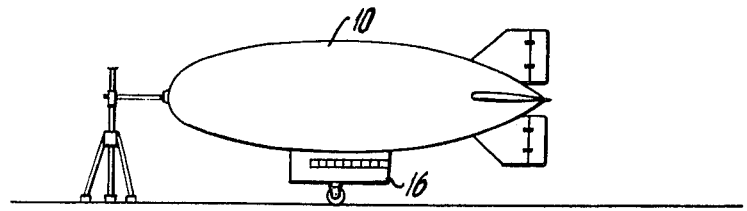
FIG. 15 is a side view of anchoring means for conventional airships.

According to another aspect of the present invention, the airship may be more conveniently and safely anchored than currently used airships. Conventional lighter-than-air airships are anchored in a generally horizontal orientation with the nose (bow) of the gas envelope rotatably attached to a tall pole, as shown generally in FIG. 15. In addition, a castor may be attached to the bottom of the gondola (which is rigidly attached to the gas envelope) such that the entire airship may be freely rotatable about the pole and move under the influence of prevailing winds. Thus, a substantially large land area is required to allow such airships to rotate 360° around the swivel or pivot point to accommodate all wind conditions.

However, in a particularly useful embodiment of the present invention, means are provided for securely and safely anchoring the airship at a landing site of limited area. Accordingly, attachment means 70 may be provided on gondola 16, substantially at the front thereof for pivotal attachment to stanchion 72 which is firmly secured to the ground, as shown in FIG. 16. Thus, when the airship is brought into a vertical orientation for landing, as described hereinbefore, the airship may be anchored to stanchion 72 on the ground by attachment means 70. Thereafter, positioning means 35 may be left slack to enable vertically extending gas envelope 10 to move or rotate (as indicated by arrow 82) through any angle α under the influence of prevailing winds (indicated by the arrows 80).

Accordingly, an airship including this feature of the present invention can be anchored to the ground so as to be substantially freely rotatable about stanchion 72, yet allowing vertical angular movement of envelope 10 with respect to gondola 16. The airship is therefore provided with sufficient "give" to yield to prevailing winds for preventing damage thereto while anchored. As here preferably embodied, roller means 73 (advantageously a castor) may be provided near or at the back end of gondola 16 to provide a second support point on gondola 16 such that the back end of the gondola can swing around stanchion 72 together with envelope 10 as a unit. Thus, stanchion 72 is shorter than currently used anchoring poles for strength and low cost.

Figure 17:
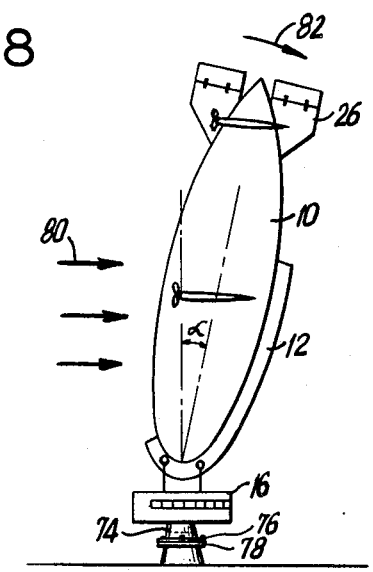
FIG. 17 is a side view of another embodiment of anchoring means according to the invention.

Another preferred embodiment of anchoring means is shown in FIG. 17. According to this embodiment, the airship includes anchoring structure 74 secured to the bottom of gondola 16, generally at its mid-section or, preferably, at its center of gravity. Anchoring structure 74 is advantageously provided with mounting plate 76 adapted for secure engagement to a suitable anchor plate 78 secured to the ground. Anchoring structure 74, secured through mounting plate 76 and anchor plate 78 is rotatable with respect to gondola 16 and the ground. Accordingly, when mounting plate 76 and anchor plate 78 are coupled, the entire airship is capable of rotating or swiveling about the point to which anchor plate 78 is secured to the ground. In addition, with positioning means 35 maintained slack, the airship is provided with sufficient vertical angular yield capability to avoid being damaged by strong winds while the airship is anchored.

Advantageously, mounting plate 76 includes magnet means (described more fully hereinafter) operable from the gondola, which is capable of generating a strong attractive force to ferromagnetic (i.e. magnetically attractive) anchor plate 78. Accordingly, when the airship has descended, as described hereinbefore, the magnet may be energized to attract the airship to anchor plate 78. Thereafter, plates 76 and 78 may be clamped together by any conventional clamping means to provide secure coupling between plates 76 and 78. For ascent, the clamps are removed and the magnet deactivated, and the airship may ascend as described hereinbefore. As here preferably embodied, mounting plate 76 (which includes the magnet means) is rotatable with respect to gondola in order that the airship may be safely anchored (as discussed immediately above) to a simple steel plate secured to the ground, either as a standard procedure or during an emergency.

Advantageously, and as here preferably embodied, by utilizing propulsion devices 90 and/or 92, the axis of envelope 10 is maintained at a small angle with respect to vertical (i.e. ranges from about 5° to 15°) in order that the airship will more easily swivel around stanchion 72, or anchoring structure 78, under the influence of varying wind directions. Thus, with the pre-inclined angular orientation of envelope 10, it acts somewhat like a weather vane to accommodate changes in wind direction, thereby significantly lessening any possibility of straining of airship under such conditions.

Figure 19:
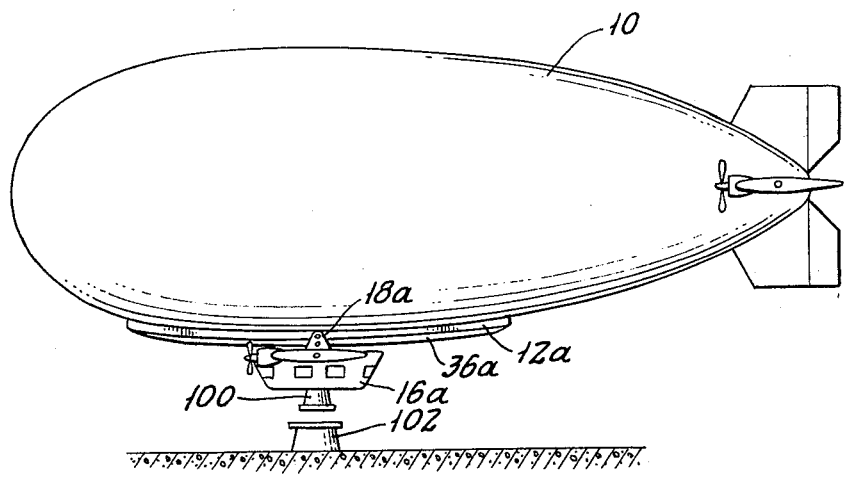
FIG. 19 is a side view illustrating apparatus for anchoring airships, according to the present invention.
Figure 20:
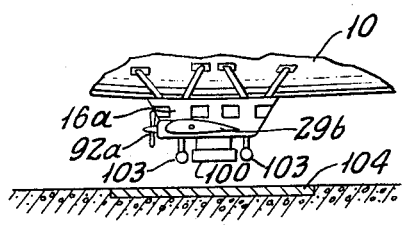
FIG. 20 is a partial side view of the apparatus shown in FIG. 19, modified in accordance with another feature of the present invention.

Referring now to FIGS. 19-20, there is illustrated a further aspect of the method and associated apparatus for landing and anchoring airships according to the present invention. According to the aspect shown in FIG. 19, the airship is preferably formed with a "short track" 12a attached to the envelope, which extends at least between the points of maximum change in location, fore and aft, of the center of dynamic and/or static balance (described more fully below) of the airship, to span at least all the points at which the center of dynamic and/or static balance of the airship may occur so that the gondola may be positioned at such center for any given loading and ballonetloading condition, as by positioning along track 12a by attachment means 18a.

It will be understood that track 12a may be constructed essentially the same as the "long track" structures (i.e., track 12) disclosed above with respect to FIGS. 1-14 and 16-18, except that it does not extend around the nose of the airship as shown in those figures. Moreover, although gondola 16a is illustrated somewhat different than gondola 16 described above, the gondola used according to the aspects of the invention described with reference to FIGS. 19-28 may be any gondola, such as gondola 16, adapted for variable positioning. Accordingly, the airship may include convenient means for positioning gondola 16a along member 12a, such as, for example, winch 38a and cable 36a (attached to both ends of track 12a or to any other convenient points on the airship), similar to those devices described more fully hereinbefore, as well as motorized mounting means 18 illustrated in FIG. 9c or any other convenient means for translating gondola 16a along member 12a.

Turning specifically to FIG. 19, magnet means 100 is mounted to the bottom of gondola 16a and adapted to be activated for magnetically attraction to anchoring member 102, affixed to the ground. Advantageously, either member 100 or member 102 is adapted to enable rotation of gondola with respect to the ground such as described above with reference to FIG. 17; preferably, magnet means 100 is provided with the rotatable capability so that the airship will be rotatably anchorable no matter where it is anchored, as, for example, anchoring to any heavy steel plate during an emergency.

In operation, the airship is made to descend, such as by filling ballonets inside envelope 10 with air to increase the effective density of the gas within envelope 10, until it is positioned over the landing site. In addition or alternatively, the airship can be accurately positioned by utilizing the rotatably mounted propulsion means mounted thereto, so as to enable the airship to be driven towards the ground and/or to compensate for prevailing wind conditions, as needs may dictate. Furthermore, once positioned over member 102, the airship can be caused to descend closer thereto so that magnetic means 100 can be activated to bring the airship into magnetic attraction with anchoring plate 102, with the additional groundward drive provided by the propulsion devices, to enable a vertually completely vertical landing, without requiring large land areas to accommodate the foreward moving landing approach needed in conventional landing and anchoring techniques.

Referring to FIG. 23b there is shown a preferred embodiment of rotatably mounted propulsion devices. According to this aspect of the invention, propulsion devices 92a are rotatably mounted to the airship gondola so as to be positioned sufficiently outboard of the gondola that a substantial portion of the upward stream of air flow (i.e., the downwardly pulling thrust provided when devices 92a are oriented to provide thrust perpendicular to the airship's longitudinal axis) is projected at a portion of the airship envelope 10 having a slope of no less than about 45° (as shown in phantom in FIG. 23b). In this way, the major part of the thrust from devices 92 will not be negated by its incidence upon the flatter portions of the bottom of envelope 10 and most of the thrust which is incident on envelope 10 will be directed upwardly by the contour of the envelope. As preferably embodied, and as specifically shown in solid lines in FIG. 23b, propulsion devices 92a are located outwardly so as to be at least directly under the outermost edge of envelope 10 so that at least half the thrust therefrom is projected completely clear of envelope 10. Moreover, it is preferred that propulsion devices 92a are mounted to gondola 16a by rotatably wings 29a to provide additional lift and guidance for the airship. However, it will be understood that propulsion devices 92a can simply be mounted by any convenient support structure.

Alternatively, devices 92a can be mounted by rotatable wings 29a mounted to envelope 10 above gondola 16a but below the longitudinal axis of the airship, as illustrated in FIG. 22. Thus, the weight of propulsion devices 92a and wings 29a will be located relatively low on the airship for stability.

Advantageously, magnetic means 100 should be strong enough, given the lift capabilities of the airship at its lightest condition (e.g., no load and little or no fuel), to maintain magnetic anchoring engagement with ground anchoring member 102 so that the airship will remain anchored despite a strong gust or updraft of wind. Once the airship is "initially anchored" by the magnetic attraction between members 102 and magnetic means 100, the airship is thence preferably mechanically anchored, as by clamping or otherwise fastening magnet 100 or a portion thereof to member 102 or to some other structure secured to the ground.

Referring specifically to FIG. 20, magnet means 100 is attached to the bottom of gondola 16a (which is shown fixedly attached to the airship envelope) along with roller means 103 which are preferably swivelling castors. Here, magnet 100 is provided with the rotatable capability and is dimensioned with its bottom surface defining a plane which generally co-incides with the plane defined by the bottom of roller means 103 so that the airship can be landed on a simple flat plate (indicated at 104) of magnetically attractive material. However, it will be understood that the proportioning of the bottom of the member 100 may be adapted to accommodate any spring-like or shock-absorbing capability built into roller means 103. In this way, the pilot can simply hover generally over plate 104 and cause the airship to descend to effect mating between the magnet and the plate by activating magnet means 100.

The use of track 12a (shown in FIGS. 19 and 21) will be found particularly advantageous where convertibility of the airship's longitudinal axis between generally horizontal and generally vertical orientations, as by track 12 described above with reference to FIGS. 1-14 and 16-18, is not required. Thus, for example, track 12a will be lighter than track 12 yet will enable movement of gondola 16a so as to permit it to be variably positioned along the track, such as at the static or dynamic center of balance of the airship, or to be positioned over the anchoring member (i.e., member 102 or plate 104)

attached to the ground while the remainder of the airship hovers in a generally stationary posture.

Positioning the gondola at the dynamic center of balance is particularly useful where the airship is equipped with rotatably mounted propulsion means, especially if mounted to the gondola (as by fixed attachment to rotatably mounted wings). Thus, when the airship is ascending, for example, as a result of thrust provided by propulsion devices mounted to the gondola, the air resistance over the upper surface area of the envelope structure will generally produce a center of dynamic balance which may not coincide with the static center of gravity of the airship. Therefore, the gondola can be positioned to reside directly under the center of dynamic balance so as to enhance the equilibrium of the airship during propelled ascent as well as propelled descent. Moreover, all the propulsion devices could be mounted to the gondola, as described above, to minimize the number of propulsion devices, to keep the amount of such heavy weight well below the longitudinal axis of the ship to enhance stability and to facilitate stability during propelled descent since the downwardly "pulling" thrust will be relatively concentrated at the gondola to aid in directing the airship to its landing site.

In addition, track 12a enables the gondola to be repositioned relative to the airship envelope after the airship is anchored. In this way, the point of connection between the gondola and the airship envelope can be located at the center of gravity of the airship to enable the airship to swing around the anchoring point, under the influence of prevailing wind, generally similar to a weather vane, while the anchored airship remains essentially level. It will be understood that the vertical stabilizer can be adapted to aid in the weather vane effect by providing a large-sized vertical stabilizer to ensure that the surface area aft of the anchor point is greater than that forward of the anchor point to ensure the weather vane effect. In this way, the land area required for maintaining the airship anchored can be minimized, generally as described above.

It will be understood that by attaching "short track" 12a directly to the envelope structure (as well as "long track" 12) the airship is provided with structural integrity between the envelope and the gondola. In addition, the track can, for ease of and low costs of fabrication, be integrated as part of the frame of a rigid-type airship or as part of the envelope structure in non-rigid-type airships, such as by attachment by the attached straps encircling the envelope of the airship (as indicated in FIG. 8).

Figure 21:
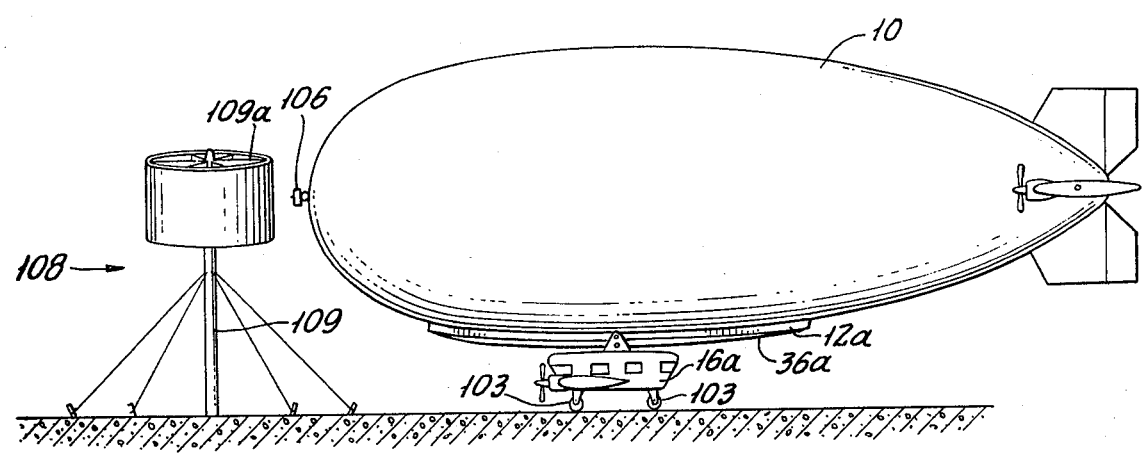
FIG. 21 is a side view illustrating an alternate embodiment of apparatus for anchoring airships, according to the present invention.

Turning now to FIG. 21, there is shown an alternate means for anchoring the airship. According to this aspect of the invention, magnet means (here indicated by reference number 106) are mounted to the airship generally at the nose of the envelope structure. In addition, an anchoring structure (indicated generally at 108) is secured to the ground and adapted to support a magnetically attractive member at a height sufficiently high to meet magnet means 106 when the airship either has landed or is within about two feet of touching ground. Also, as preferably embodied, the gondola is generally slidably mounted to the airship envelope by track 12a, substantially as described above with reference to FIG. 19.

In operation, the airship is caused to descend by increasing the effective density of the lighter-than-air gas within envelope 10 and/or by use of downwardly thrusting rotatably mounted propulsion devices, as described above with reference to FIG. 19 until it is generally at ground level. Then, with the nose of the airship facing into the wind (to minimize the cross-sectional area of the airship facing directly into the wind), the thrust from the propulsion devices can be oriented so as to propel the airship toward anchoring member 108. (In fact, if there is sufficient smooth land area available, the airship can be driven along the ground and propelled toward mast 108 similar to a taxiing aircraft).

Once magnet means 106 is in contact with, or positioned within attracting distance of the magnetically attractive portion of member 108, magnet means 106 can be activated for magnetic attraction to member 108. After means 106 and member 108 are in contact, the airship may be mechanically coupled to member 108 for fixed anchoring to the ground, whereafter magnet means 106 can be de-activated. As preferably embodied, anchoring member 108 is made up of a mast-like stanchion 109a rigidly attached to the ground and magnetically attractive drum 109b rotatably mounted to stanchion 109a.

Although the method and associated apparatus for landing and anchoring described with reference to FIG. 21 would require as much land area while anchored as conventional techniques, it still enables the pilot in the airship to anchor the ship without requiring a ground crew. Thus, the pilot can simply guide the airship into anchoring configuration by appropriately aligning stanchion 109a with suitable apparatus in the gondola cockpit and maneuvering the airship forward, into the wind, until magnet means 106 is in contact with the rotatable drum 109b. Thereafter, the pilot or a crew member can clamp or otherwise mechanically anchor the airship to drum 109b so that the airship can rotate about stanchion 109a on roller means 103 attached to the bottom of gondola 16a which, in turn, can be positioned along track 12a at the static center of gravity to optimize the support for the anchored airship. In addition, by utilizing a gondola movably attached by track 12a the gondola can be re-positioned therealong to maintain a generally horizontal attitude for the airship during landing and anchoring maneuvers.

Alternatively, as shown in FIG. 22, magnet 106 may be attached to the front of the gondola (in place of attachment means 70 described with reference to FIG. 16), with castor means 103 mounted to the bottom of the gondola. Anchoring structure 108 (including mast 109a with rotatable drum 109b) will be suitably reduced in height for locating the magnetically attractive portion (109b) at a height corresponding to the anticipated levels at which magnet 106 on the gondola will reside on various airships, and for accommodating envelope 10 which will reside over structure 108. In addition, it will be understood that an airship with magnet 106 mounted to the front of the gondola may include the full track 12 or the "short" track 12a, as described above, or it may have the gondola fixedly mounted to the envelope. With a fixed gondola, the point of attachment of magnet 106 should be generally forward of the center of gravity of the airship to keep the airship level during the "weather vane" rotatability described above, with castor means 103 mounted to the airship aft of magnet 106 preferably on the gondola.

In operation, the airship pilot simply guides the descended airship directly towards mast 108 for engagement by magnet means 106 substantially as described with respect to FIG. 21. However, since the mast will be within direct view as compared with that in FIG. 21, anchoring may be easier to accomplish.

It will be understood that any of the magnets means described hereinafter with reference to FIGS. 24-28 may be adapted for use with the embodiment shown on FIG. 22. Thus, for example, plate 120 in FIG. 24 may be curved to correspond to the curvature of drum 109a and magnet member 112 may be provided with similar curvature and adapted to travel in an arc-like pattern behind plate 110 for operating substantially as described hereinafter. Alternatively, the front of plate 110 may be curved but the back of plate 110 and the pole-end of magnet member 112 can be flat since the decrease in flux strength will generally be insignificant over the portions of the keepers, which will be thickened to provide the necessary curvature.

Turning now to FIG. 22, there is shown another embodiment of anchoring means according to the present invention, wherein anchoring means 100 is attached directly to the airship envelope 10 by support member 101 which, advantageously, provides the rotatability described above. In this way, if the airship gondola is fixedly attached to the envelope at or near the center of gravity of the airship support 101 may be positioned generally between the gondola and the nose of the airship to enable the airship to rotate about its anchoring point generally like a weather vane on one or more castor means 103 mounted to the bottom of the gondola. Advantageously, magnet means 100 may be one of those assemblies described below with respect to FIGS. 24-28. Preferably, such magnet means includes a servo-motor mechanism operable from the gondola for effecting movement of the magnet member with respect to the keeper member since the magnet member will be located remotely from the gondola.

It will be understood that the magnetic means described herein may comprise an electromagnet operable from the gondola. However, in FIGS. 24-27, there are shown various embodiments of magnet means according to the present invention, which enable utilization of the latest-design permanent magnets, such as the so-called "rare-earth" magnets, which have been found stronger, pound-for-pound, than conventional electromagnets, and retain their strength essentially indefinitely.

Referring specifically to the structure illustrated in FIG. 24, plate 110 is mounted to the bottom of gondola 16 by support struts 111. Plate 110 is preferably formed of a non-magnetic material, such as brass, plastic or, preferably, aluminum (shown with shading), but has inserts (indicated at K) of highly magnetically attractive material embedded therein at predetermined spaced locations. Adjacent plate 110 is magnet structure 112, also made of a non-magnetically attractive material (preferably aluminum for durability and light weight), which houses one or more permanent magnets M. Advantageously, between magnet structure 112 and plate 110 is provided a low friction layer or coating, such as a "TEFLON" coating, to enable magnet structure 112 to be slid over the keeper inserts embedded within plate 110.

In addition, magnet member 112 is mounted to gondola so as to be movable between open-flux and closed-flux positions. To this end, for example, lever 114 may be pivotally attached to magnet member 112 and attached to gondola 16 by support members 116 so as to be pivotal about its connection point yet slidable with respect thereto to enable magnet member 112 to slide over plate 110 while remaining in contact therewith, as by the slidable pivotal coupling between lever 114 and support 116, indicated at 115.

Thus, with both north (N) and south (S) poles of each magnet in member 112 covered by the same keeper element K, the magnetic flux of each magnet element is short circuited so that essentially no magnetic attraction occurs between plate 110 and plate 120 embedded in the ground, as shown in FIG. 24. However, when the position of magnet structure 112 is shifted so that two different keeper elements cover the poles of the same magnet, with each keeper covering similar poles of different magnet elements, the flux is open and attraction between plates 110 and 120 occurs.

As preferably embodied, the connection between supports 111/116 and the gondola are adapted to enable rotation of plate 110 (and magnet member 112) with respect to the gondola. Moreover, it will be understood that lever 114 may be eliminated and that member 112 may be coupled to a servo-motor mechanism, operable from and rotatably mounted to the gondola so that the re-positioning of member 112 on plate 110 may be effected remotely from the gondola rather than manually.

In operation, when the airship has been positioned over the landing site, member 112 may be positioned in the open-flux position (as in FIG. 25b) for attracting the airship towards plate 120. Once mating has been effected, plate 110 can be clamped or otherwise mechanically secured to plate 120 (or any other structure secured to the ground) to firmly anchor the airship. When ascent is desired, the mechanical clamp is removed and the member shifted to the closed-flux position (as in FIG. 25a) to remove the attraction between plates 110 and 120 so that the airship can lift-off.

Turning now to FIGS. 26-28, there is shown an alternate embodiment of the aspect of the present invention described with reference to FIGS. 24 and 25. According to this embodiment, the magnets are held on their sides in a circular or cylindrical structure 122 which in turn is positioned in rotatable posture relative to and adjacent cylindrical member 124 which is made of non-magnetic material and holds keeper elements K. Advantageously, keeper-holding cylinder 124 may be rotatably mounted to the gondola and magnet-holding member 122 may be rotatably mounted within member 124. However, it will be understood that magnets M and keepers K could be reversed, with the magnets in outer cylinder 124 and keepers in inner cylinder 122.

In operation, when the airship is properly positioned over the landing site, the magents can be aligned so as to overlap keeper elements as illustrated in FIG. 28 for attraction to steel plate 120 (followed by mechanical coupling therebetween, as described above). When ascent is desired, the coupling is released and the inner cylinder can be rotated, as by handle 126 so that each magnet is covered by a single keeper to close the flux and allow the airship to ascend.

It will be understood that although the outermost cylinder is rotatable with respect to the gondola and the inner and outer cylinders are rotatable with respect to each other, the relative positioning of the inner and outer cylinders must remain fixed at any given time in order to maintain the desired alignment between keepers and magnets. Thus, for example, lever 126 on inner cylinder may be provided with locking means for maintaining the desired relative positioning between the cylinders. However, as indicated above, it will be understood that a servo-motor mechanism or other mechanized drive means may be utilized to rotate the one cylinder relative to the other, yet maintain the desired relative positioning.

It will be found that the methods for anchoring and the magnetic anchoring means according to the present invention enable the airship pilot to land the airship directly on the ground without the need for suspending anchoring mechanisms by cables, or the like, which serves only to encumber the landing and anchoring procedures.

Those skilled in the art will recognize that certain changes or modifications may be made in the structures described above, without departing from the scope and spirit of the invention as defined in the appended claims. Accordingly, the invention in its broader aspects is not limited to the specific embodiments herein shown and described, but variations may be made therefrom within the scope of the accompanying claims, without departing from the principles of the invention and without sacrificing its principal advantages.

What is claimed is:

1. An improved airship having a generally elongate envelope structure adapted to house lighter-than-air gas and any enclosure means which may be used for containing the gas, with a gondola and propulsion means on the airship, wherein the improvement comprises anchoring means which include magnet means mounted to said airship and fixed thereto against translational and pivotal movement, said magnet means adapted to permit rotation of the airship about a vertical axis extending through said magnet means and being capable of activation from a point remote therefrom for attraction to a suitable magnetically attractive anchoring member secured to the ground, such that said airship can be landed and anchored on the ground by personnel on the airship, said magnet means enabling the airship to rotate completely about the vertical axis of said magnet means when said airship is anchored to the ground.

2. An improved airship according to claim 1 wherein said magnet means is positioned on the bottom of the gondola and which further includes castor means mounted to the bottom of said airship.

3. An improved airship according to claim 2 wherein said magnet means is an electromagnet.

4. An improved airship according to claim 2 wherein said magnet means includes a magnet member housing a plurality of permanent magnet elements positioned in a predetermined spaced configuration with non-magnetically attractive insulating elements located in the spaces between magnetic poles of said magnet elements, and a keeper member supporting keeper inserts of magnetically attractive material in a configuration corresponding to the predetermined spacing of said magnet elements, said keeper elements proportioned to cover both poles of one said magnet element and spaced from each other by non-magnetically attractive material, said magnet member adapted for variable positioning between a first position wherein each said keeper covers both poles of its corresponding magnet element such that all magnet elements are covered to substantially prevent magnetic attraction between said magnet means and said anchoring member, and a second position wherein a portion of each said keeper covers one pole of a magnet element and another portion of each said keeper covers the corresponding pole of another magnet element such that substantially all the magnetic flux of said magnet element is available to attract said anchor member.

5. An improved airship according to claim 4 wherein said keeper member is a substantially flat plate mounted to said gondola and said magnet member is adapted to support said magnet elements with the axes of their magnetic poles generally perpendicular to said flat plate.

6. An improved airship according to claim 5 wherein said magnet member and said keeper member are rotatably mounted to said gondola.

7. An improved airship according to claim 4 wherein said keeper member includes a first generally cylindrical portion supporting said keeper elements and said magnet member includes a second generally cylindrical portion adapted to support said magnet elements with the axes of their magnetic poles generally perpendicular to said keeper elements in said first cylindrical portion, one of said first and second cylindrical portions adapted to rotate with respect to the other.

8. An improved airship according to claim 7 wherein the other of said first and second cylindrical portions is rotatably mounted to said gondola.

9. An improved airship according to claim 2, wherein said gondola is generally slidably mounted to said airship such that said gondola can be positioned at generally any desired location relative to the longitudinal axis of said envelope structure to permit positioning of said gondola at the dynamic and the static centers of balance of the airship.

10. An improved airship having a generally elongate envelope structure adapted to house lighter-than-air gas and any enclosure means which may be used for containing the gas, with a gondola and propulsion means on the airship, wherein the improvement comprises anchoring means which include:

magnet means generally fixedly mounted to the front end of the gondola and capable of being activated from the position remote therefrom, said magnet means providing a magnetic engaging surface extending generally perpendicular to the longitudinal axis of the airship;

a generally mast-like upright member firmly secured to and extending vertically upwardly from the ground and having a portion made of a magnetically attractive material rotatably mounted to the top of said mast-like member at a height corresponding generally to the height of said magnet means when said airship is anchored for enabling said airship to be anchored by magnetic attraction between said magnet means and said top portion of said mast-like structure; and castor means affixed to said airship for enabling said airship to roll along the ground while rotating around said mast-like member, such that said airship can be landed and anchored on the ground by personnel on the airship and said airship can rotate completely around said mast-like member when anchored thereto.

11. An improved airship according to claim 10 wherein said castor means are mounted to said gondola to enable said airship to rotate about said anchoring member when anchored to the ground such that the paved land area required for accommodating rotation of the airship can be minimized.

12. An airship according to claim 11 which further includes:

attachment means for mounting said gondola to said envelope structure to permit generally slidable mounting of said gandola to said envelope structure; and means for moving said gondola with respect to the longitudinal axis of said envelope structure for positioning said gondola at generally any desired position relative to the longitudinal axis.

13. An airship according to claim 12 which includes propulsion means rotatably mounted to the gondola.

14. An airship according to claim 12 wherein said attachment means extends generally around to the nose of the airship such that the envelope structure of the airship can be rotated between generally horizontal and generally vertical configurations while the gondola remains generally horizontal.

15. An airship according to claim 14 which includes propulsion means rotatably mounted to the gondola.

16. An improved airship according to claim 2 wherein said propulsion means includes at least two propulsion devices rotatably mounted to said airship to enable the airship by rotatably mounted support members to be propelled vertically downwardly and upwardly while in a generally horizontal orientation.

17. An improved airship according to claim 16 wherein said rotatably mounted propulsion devices are fixedly mounted to support members rotatably mounted to the gondola.

18. An improved airship according to claim 17 wherein said rotatably mounted support members are adapted to position said propulsion devices mounted thereto such that said propulsion devices are located under the point of the envelope having a slope of no less than about 45° with respect to the longitudinal axis of the airship.

19. An improved airship according to claim 18 wherein said rotatably mounted support members comprise wings.

20. An improved airship according to claim 18 wherein said rotatably mounted support members are adapted to position said propulsion devices at points essentially directly under the outermost portion of the envelope.

21. an improved airship according to claim 20 wherein said rotatably mounted support members comprise wings.

22. An improved airship according to claim 9 which further includes:

attachment means for mounting said gondola to the envelope structure to permit generally slidable mounting of the gondola to the envelope structure, said attachment means extending, fore and aft of the airship, to permit locating of the gondola at essentially any point at which the center of static and dynamic balance of the airship is anticipated to occur; and means for slidably mounting and moving said gondola on said attachment means.

23. An improved airship according to claim 2 wherein said magnet means is located essentially at the center of gravity of the airship, and which further includes castor means mounted to the airship both fore and aft of the center of gravity for maintaining the airship essentially level while anchored.

24. A method of landing and anchoring an airship, which comprises the steps of:

causing the airship to descend generally to about ground level at an anchoring site where a magnetically attractive anchoring structure is secured to the ground;

moving the airship to locate rotation-enabling magnet means which are fixedly mounted to the airship against translational and pivotal movement, to a position essentially adjacent the anchoring structure;

actuating the magnet means to permit magnetic attraction between the magnet means and the anchoring member for contact therebetween; and permitting the airship to rotate about the vertical axis extending through the magnet means for a virtually unlimited number of rotations.

25. A method according to claim 24, wherein a gondola is mounted to the airship and the magnet means are mounted to the bottom of the gondola and wherein said positioning step comprises the step of positioning the magnet essentially directly over the anchoring 26. A method according to claim 24, wherein a gondola is mounted to the airship and the magnet means are mounted to the front of the gondola to provide a magnetic engaging surface extending perpendicular to the longitudinal axis of the airship and wherein said positioning step comprises the step of positioning the magnet means so as to be essentially directly adjacent an anchoring structure affixed to and vertically upstanding from the ground.

27. A method according to claim 24 wherein said positioning step comprises the step of positioning magnet means, which are mounted to the front of the airship and provide a magnetic engaging surface extending perpendicular to the longitudinal axis of the airship, so as to be essentially directly adjacent an anchoring structure affixed to and vertically upstanding from the ground.

28. A method according to claim 24 which further includes the steps of:

mechanically securing the airship to the ground after contact has been achieved between the magnet means and the anchoring member; and deactivating the magnet means.

29. A method according to claim 28 wherein said securing step is conducted between the magnet means and the anchoring member.

30. A method according to claim 29 which further includes the step of locating the magnet means at a position generally aligned with the center of gravity of the airship such that the airship is rotatable under the influence of prevailing wind.

31. A method according to claim 25 which further includes the steps of:

mechanically securing the airship to the ground after contact has been achieved between the magnet means and the anchoring member; and deactivating the magnet means.

32. A method according to claim 31 wherein said securing step is conducted between the magnet means and the anchoring member.

33. A method according to claim 32 which further includes the step of locating the gondola at a position generally forward of the midpoint of the airship longitudinal axis such that the airship is rotatable under the influence of prevailing wind.

34. A method according to claim 26 which further includes the steps of:

mechanically securing the airship to the ground after contact has been achieved between the magnet means and the anchoring member; and deactivating the magnet means.

35. A method according to claim 34 wherein said securing step is conducted between the electromagnet means and the anchoring member.

36. A method according to claim 27 which further includes the steps of:
mechanically securing the airship to the ground after contact has been achieved between the magnet means and the anchoring member; and
deactivating the magnet means.

37. A method according to claim 36 wherein said securing step is conducted between the electromagnet means and the anchoring member.

38. A method according to claim 24 which further includes the step of ceasing generally all forward motion of the airship before causing the airship to descend and wherein said step of causing the airship to descend comprises the step of providing generally vertically oriented thrust generally perpendicular to the longitudinal axis of the airship such that said airship descends in a generally horizontal configuration.

39. An improved airship having a generally elongate envelope structure adapted to house lighter-than-air gas and any enclosure means which may be used for containing the gas, a gondola and propulsion means on the airship, wherein the improvement comprises anchoring means which include magnet means mounted to the airship and fixed thereto against translational and pivotal movement, said magnet means adapted to provide magnetic attraction to a magnetically attractive anchoring structure secured to the ground, said anchoring means adapted to enable virtually continuous rotation of the airship about a vertical axis extending through said magnet means when anchored to the anchoring structure so that the airship can swing around the vertical axis under the influence of prevailing winds.

40. An improved airship according to claim 39 wherein said magnet means includes a magnet member housing a plurality of permanent magnet elements positioned in a predetermined spaced configuration with non-magnetically attractive insulating elements located in the spaces between magnetic poles of said magnet elements, and a keeper member supporting keeper inserts of magnetically attractive material in a configuration corresponding to the predetermined spacing of said magnet elements, said keeper elements proportioned to cover both poles of one said magnet element and spaced from each other by non-magnetically attractive material, said magnet member adapted for variable positioning between a first position wherein each said keeper covers both poles of its corresponding magnet element such that all magnet elements are covered to substantially prevent magnetic attraction between said magnet means and said anchoring member, and a second position wherein a portion of each said keeper covers one pole of a magnet element and another portion of each said keeper covers the corresponding pole of another magnet element such that substantially all the magnetic flux of said magnet element is available to attract said anchor member.

41. An improved airship according to claim 40 wherein said keeper member is a substantially flat plate mounted to said gondola and said magnet member is adapted to support said magnet elements with the axes of their magnetic poles generally perpendicular to said flat plate.

42. An improved airship according to claim 40 wherein said keeper member includes a first generally cylindrical portion supporting said keeper elements and said magnet member includes a second generally cylindrical portion adapted to support said magnet elements with the axes of their magnetic poles generally perpendicular to said keeper elements in said first cylindrical portion, one of said first and second cylindrical portions adapted to rotate with respect to the other.

* * * * *